United States Patent Office 3,164,400
Patented Jan. 5, 1965

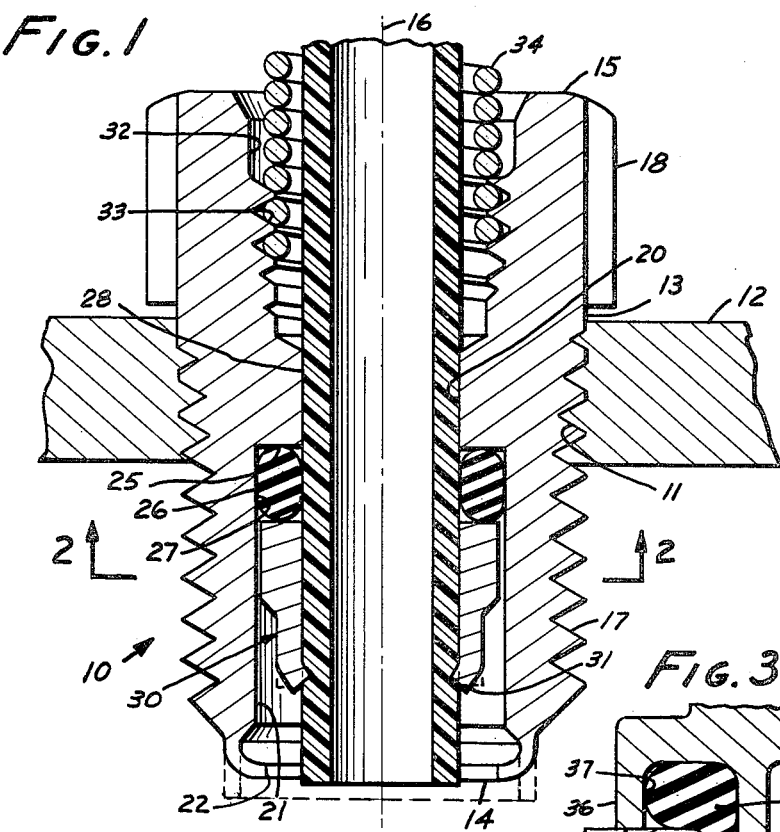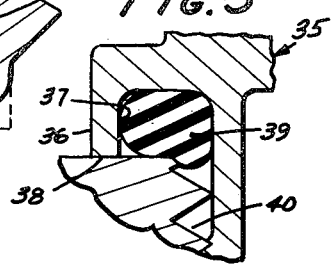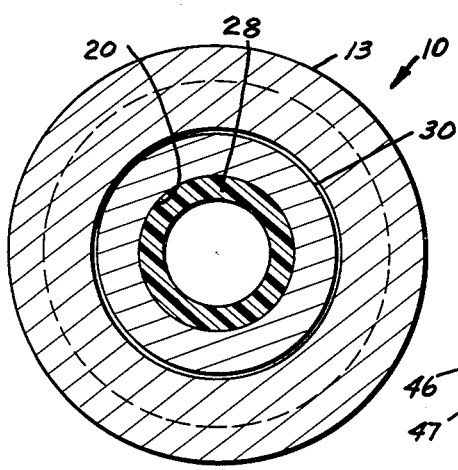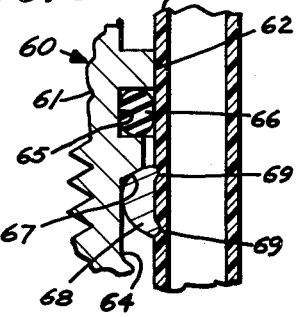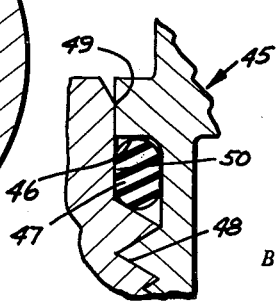
INVENTOR.
PAUL J. WEAVER
BY Angus & Mow
ATTORNEYS.

3,164,400
CONNECTOR FOR FLEXIBLE TUBE TO PORTED PLATE
Paul J. Weaver, Pasadena, Calif., assignor to Stanley G. Harwood, South Pasadena, Calif.
Filed Feb. 7, 1961, Ser. No. 87,616
3 Claims. (Cl. 285—114)

This invention relates to a tube connector for connecting a flexible tube to a port.

There are many applications wherein it is desirable to connect flexible tubing to a port, such as a cylinder port, while keeping the total envelope size to a minimum. Such an objective has not hitherto been attained. For example, a standard fitting for connecting a 1/8" O.D. tube to a 5/16" pipe threaded port projects about 3/4" from the outer end of the port, and the tube cannot start to bend within that 3/4" dimension. This results in a significant increase in the envelope. The coupler of the instant invention projects only far enough beyond the port to provide wrenching surfaces, and even this can be minimized or eliminated by the use of internal wrenching surfaces, if desired. Furthermore, the tubing can start its bend at or very near the outer end of the port, thereby decreasing the length of the envelope by at least 3/4" in comparison with a standard fitting. In miniaturized installations, this is a very considerable saving in bulk size.

A tube connector according to this invention includes a body which is adapted to fit in a port in a member, the body having an axial passage therethrough. A counter-bore is formed in the first end of the body. The tube passes through the passage and projects into the counter-bore where a sealing ring in the counter-bore extends and seals between the tube and the wall of the counter-bore. A ferrule, which is also located in the counter-bore, encircles the tube and has a lip which is crimped inwardly to indent the wall of the tube, thereby holding the tube in the counter-bore. A lip on the body adjacent to the said first end is crimped inwardly into the path of a ferrule and retains the ferrule in the counter-bore. The tube is thereby firmly held and sealed in the port.

According to optional features of the invention, means can also be provided for sealing between the wall of the port in which the body is fitted and the body itself, one of said means comprising an external shoulder on the body which is adapted to enter into the port, and an external sealing ring trapped between the shoulder, the body, and the wall of the port. Another means is to provide a ring groove in an external shoulder on the body and place a sealing ring therein so that it can bear against the element in which the port is formed so as to seal between that element and the body.

The above and other features of this invention will be fully understood from the following detailed description and the accompanying drawings, in which:

FIG. 1 is a cross-section of the presently preferred embodiment of the invention;

FIG. 2 is a cross-section taken at line 2—2 of FIG. 1; and

FIGS. 3–5 are fragmentary cross-sections showing alternate embodiments of the invention.

In FIG. 1 there is shown a tube connector 10 mounted to a port 11 in element 12. Element 12 may be the wall of a piston-cylinder assembly, or a tank, reservoir, or the like. The connector includes a body 13 which has a first end and a second end 14, 15, respectively, and a central axis 16. Near the first end, external threads 17 are formed, enabling the body to be threaded into the threaded port. Adjacent to the second end, external wrench-engaging surfaces 18 are formed so that the body can be turned down into the port. Other types of wrench-engaging surfaces could have been provided instead, such as internal wrenching surfaces.

An axial passage 20 extends through the body. At the first end of the body, the passage includes a counter-bore 21 and terminates at a lip 22. The lip is shown in dotted line to indicate its initial configuration. The solid line shows its crimped or staked configuration, which is its shape when the connector is assembled. The counter-bore terminates at an internal shoulder 25. Within the counter-bore and adjacent to the shoulder there is placed an internal sealing ring 26, which extends between wall 27 of the counter-bore and tube 28. The sealing ring is squeezed between these two surfaces to make a sealing fit between the tube and the wall of the counter-bore.

A tubular ferrule 30 encircles the tube and stands in the counter-bore adjacent to the sealing ring. It has a lip 31 whose initial configuration is shown in dotted line. The solid line shows is crimped or staked configuration, which is its shape when the connector is assembled. When crimped or staked, the lip indents the tube and restrains it from pulling out in an upward direction. Lip 22 on the body stands in the path of the ferrule to prevent it from falling out in a downward direction. Therefore, when there is a differential fluid pressure across the connector tending to push the tube upwardly, the tube will tend to move to the position shown in FIG. 1. When the pressure is off, the O-ring will tend to hold the tube in about the same position. If the tubing were shoved downwardly, its downward motion would be limited by contact between the ferrule and lip 22.

A second counter-bore 32 is formed at the second end of the body. The second counter-bore has an internal thread 33, which thread receives the end of a coil spring 34. The coil spring surrounds the tube and prevents the tube from kinking when it bends. The second counter-bore preferably extends axially below the wrenching surfaces, so that the tube can start its bend at or even below the outer end of the port into which the body is screwed.

FIG. 1 shows a body with external pipe threads threaded into a port having internal pipe threads. Such a seal is quite adequate for most purposes. However, not all ports have pipe threads. Many users prefer straight threads. While a straight thread will fit into a pipe thread, the reverse is not true. Therefore, in order to satisfy all users, it might be necessary to provide bodies having pipe threads, and bodies having straight threads. This increases inventories. This could be avoided by manufacturing all bodies with straight threads, and providing external seals for sealing between the body and the wall of the port into which it is screwed. This external seal could also be used to provide a more positive seal even when like threads are used on the body and in the port. FIGS. 3 and 4 show such seals.

In FIG. 3 there is shown a body 35 which is identical to body 13 with the addition of an external shoulder 36 which has a ring groove 37 in its face 38. Face 38 faces toward the first end of the body. An external sealing ring 39 is seated in the ring groove and is of such a volume and shape as to project beyond the groove when not squeezed. When the body is threaded into a port 40, the sealing ring will make a fluid sealing contact between the body and the element in which port 40 is formed.

The embodiment of FIG. 3 requires a radial projection of the body outwardly of the port, which is satisfactory for many installations. However, one of the advantages of the present invention is that the entire connector need take up little more cross-section area than the port within which it is fitted. Should it be desired to keep the envelope within this size, still providing a body-to-element seal, the device of FIG. 4 may be utilized which includes a body 45 identical to body 13 with the addition of an external shoulder 46, which abuts an external sealing ring 47 that encircles the body. Port 48 includes a counter-sink 49 with a smooth wall 50 against which the one side of the sealing ring bears, the other side bearing against the body so as to make a body-to-element seal.

FIG. 5 shows a connector 60 with a slightly different ferrule construction. It includes a body 61 with a passage 62 to pass a tube 63, a counter-bore 64, which counter-bore includes an internal ring groove 65. A sealing ring 66 is fitted in this groove. A sloping shoulder 67 is also provided in the counter-bore against which a ferrule 68 bears. The ferrule encircles the tube and has a pair of lips 69 crimped or staked into the wall of the tube. The tool to crimp this ferrule is somewhat simpler than the tool to crimp the ferrules of FIGS. 1–4, which is an advantage. A disadvantage resides in the cost of undercutting groove 65. The external seals of FIGS. 3 and 4 can be used with this embodiment, if desired.

The invention is useful with many types of flexible tubes. It is also useful with metallic tubing which is sufficiently malleable or deformable to accommodate the crimped lip of the ferrule. Its principal utility is with tubes made of flexible material which is deformable, but which does not substantially cold-flow, the outstanding example being nylon. Nylon tubing will resist both the pressure of the internal seal ring and also the deformation of the lip in the sense that it will not cold-flow away from these elements, so that the seals and grips made by them will be maintained.

Utilizing this device reduces the external bulk of tubing fittings by as much as 50%, and enables the tube to start its bend at or very near to the top of the port into which the connector is inserted. This provides a device which is particularly advantageous for use with miniature air cylinder-piston assemblies, and other fluid actuated devices in which connections to fluid lines must be made and which preferably ought to be kept small in bulk, although it is not limited to such applications, or even to miniature applications.

This invention is not to be limited by the embodiments shown in the drawings and described in the description which are given by way of example and not of limitation, but only in accordance with the scope of the appended claims.

I claim:

1. A tube connector for connecting a flexible tube to a port comprising: a body having an axis and being adapted to fit in the port, said body having an axial passage therethrough, and a free and unimpeded counter-bore at a first end, said tube passing through the passage and projecting into the counter-bore; a sealing ring in the counter-bore extending and sealing between the tube and the wall of the counter-bore; a ferrule in said counter-bore which encircles said tube, said ferrule lying closer to the first end than the sealing ring; a lip on said ferrule which lip is crimped inwardly permanently to indent into the wall of the tube; an external shoulder on the ferrule, which shoulder is shorter than the length of the counter-bore and which has outer radial dimensions that are no greater than respective radial dimensions of the counter-bore, whereby the ferrule can shift axially in the counter-bore; and a lip on said body adjacent to the said first end, which latter lip is crimped inwardly into the path of the ferrule shoulder to retain the ferrule in the counter-bore, the ferrule retaining the tube in the body, those portions of the tube axially aligned with the connector being radially deformed only where they are indented by the ferrule.

2. A tube connector according to claim 1 in which the passage includes a second end in which there is retained a coil spring which encircles the tube to prevent the tube from kinking.

3. A tube connector according to claim 1 in which the counter-bore includes a ring groove for receiving said sealing ring, and a shoulder between the said ring groove and the ferrule.

References Cited in the file of this patent

UNITED STATES PATENTS

| | | |
|---|---|---|
| 1,781,222 | Fischer | Nov. 11, 1930 |
| 1,977,219 | Williams | Oct. 16, 1934 |
| 1,983,840 | Dohner | Dec. 11, 1934 |
| 2,014,988 | Schechter et al. | Sept. 17, 1935 |
| 2,037,812 | McKendrick | Apr. 21, 1936 |
| 2,048,117 | Gish | July 21, 1936 |
| 2,090,251 | Cowles | Aug. 17, 1937 |
| 2,251,715 | Parker | Aug. 5, 1941 |
| 2,273,396 | Couty | Feb. 7, 1942 |
| 2,284,365 | Briegel | May 26, 1942 |
| 2,343,235 | Bashark | Feb. 29, 1944 |
| 2,354,925 | Mills et al. | Aug. 1, 1944 |
| 2,373,253 | Martin | Apr. 10, 1945 |
| 2,413,878 | Maky | Jan. 7, 1947 |
| 2,560,263 | Wiegand et al. | July 10, 1951 |
| 2,852,281 | Ellis | Sept. 16, 1958 |
| 2,912,262 | Franck | Nov. 10, 1959 |